United States Patent
Uematsu et al.

(10) Patent No.: US 11,932,119 B2
(45) Date of Patent: Mar. 19, 2024

(54) ELECTRIC TROLLEY

(71) Applicant: Panasonic Intellectual Property Management Co., Ltd., Osaka (JP)

(72) Inventors: Hiroyuki Uematsu, Osaka (JP); Hidekatsu Ozeki, Gifu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 186 days.

(21) Appl. No.: 17/559,630

(22) Filed: Dec. 22, 2021

(65) Prior Publication Data

US 2022/0111738 A1    Apr. 14, 2022

Related U.S. Application Data

(63) Continuation of application No. PCT/JP2020/028822, filed on Jul. 28, 2020.

(30) Foreign Application Priority Data

Aug. 5, 2019 (JP) .................................. 2019-143747

(51) Int. Cl.
*A61G 5/04* (2013.01)
*B60L 15/20* (2006.01)
*B60T 7/12* (2006.01)

(52) U.S. Cl.
CPC ............ *B60L 15/2009* (2013.01); *B60T 7/12* (2013.01); *B60L 2200/24* (2013.01);
(Continued)

(58) Field of Classification Search
CPC ............ B60L 15/2009; B60L 2200/24; B60L 2200/30; B60L 2200/34; B60L 2240/12;
(Continued)

(56) References Cited

U.S. PATENT DOCUMENTS 4,511,825 A * 4/1985 Klimo .................... B60L 50/52
                                                   318/67
4,634,941 A * 1/1987 Klimo .................. A61G 5/1054
                                                   318/587
(Continued)

FOREIGN PATENT DOCUMENTS

CN    202440196 U  *  9/2012
CN    109478069       3/2019
(Continued)

OTHER PUBLICATIONS

Extended European Search Report dated Aug. 24, 2022 in corresponding Europen Patent Application No. 20849267.8.
(Continued)

*Primary Examiner* — Justin Holmes
(74) *Attorney, Agent, or Firm* — WENDEROTH, LIND & PONACK, L.L.P.

(57) ABSTRACT

Electric trolley includes safety controller that determines whether or not to stop the driving of driving wheel, and driving commander that outputs, to the motor driver, (i) an operation permission signal for permitting motor to be operated and (ii) a control signal for controlling an operation of motor, in which safety controller performs control to stop inputs of the operation permission signal and the control signal to motor driver when the safety controller determines to stop the driving of driving wheel.

7 Claims, 5 Drawing Sheets

(52) U.S. Cl.
CPC ....... *B60L 2200/30* (2013.01); *B60L 2200/34* (2013.01); *B60L 2240/12* (2013.01); *B60L 2240/647* (2013.01)

(58) Field of Classification Search
CPC .... B60L 2240/647; B60L 3/0015; B60L 3/04; B60L 2220/42; B60L 2220/46; B60L 2240/421; B60L 2240/461; B60L 15/20; B60T 7/12; B60T 2201/022; B60T 2201/10; B60T 7/22; A61G 5/04; A61G 5/045; A61G 5/1005
See application file for complete search history.

(56) References Cited

U.S. PATENT DOCUMENTS

| | | | |
|---|---|---|---|
| 6,072,292 | A | 6/2000 | Uchiyama et al. |
| 7,360,792 | B2 * | 4/2008 | Turturiello ........... A61G 5/1089 280/755 |
| 2019/0270450 | A1 | 9/2019 | Ando et al. |

FOREIGN PATENT DOCUMENTS

| | | | | |
|---|---|---|---|---|
| FR | 2744630 | A1 | * 8/1997 | ............... A61G 5/04 |
| JP | 3-086005 | | 4/1991 | |
| JP | 10-094106 | | 4/1998 | |
| JP | 2003-334218 | | 11/2003 | |
| JP | 2003334218 | A | * 11/2003 | |
| JP | 2005-323470 | | 11/2005 | |
| JP | 3957101 | B2 | * 8/2007 | ............. B60L 7/003 |
| JP | 4134719 | B | 8/2008 | |
| JP | 2011-218075 | | 11/2011 | |
| JP | 2013-065138 | | 4/2013 | |
| KR | 20150041419 | A | * 4/2015 | |
| WO | 2018/190189 | | 10/2018 | |

OTHER PUBLICATIONS

International Search Report of PCT application No. PCT/JP2020/028822 dated Sep. 24, 2020.

English-language translation of Search Report dated Oct. 20, 2023 in corresponding Chinese Patent Application No. 202080045569.3.

* cited by examiner

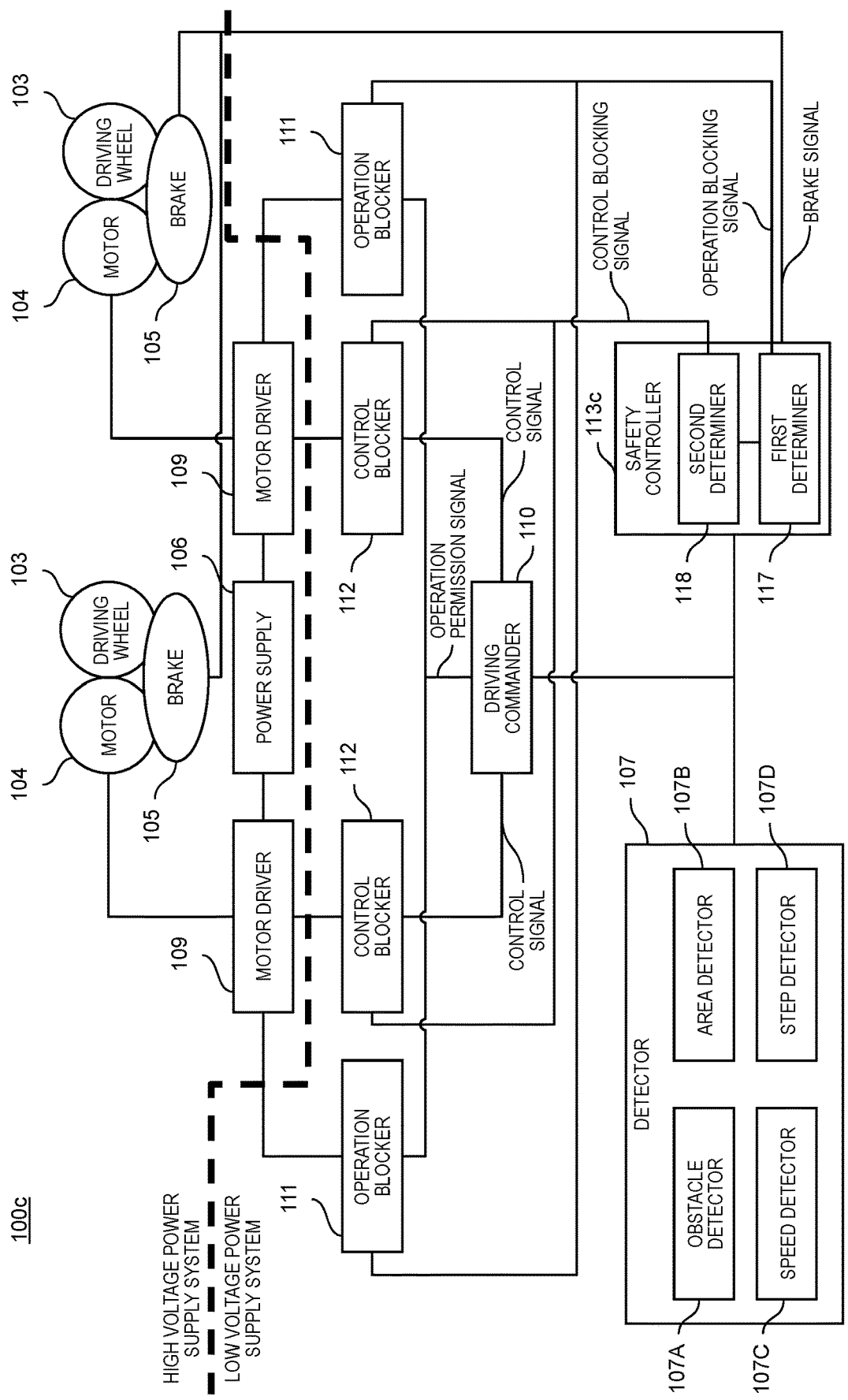

ELECTRIC TROLLEY

TECHNICAL FIELD

The present disclosure relates to an electric trolley having an automatic driving function and a steering support function.

BACKGROUND ART

There is a human-boarding type electric trolley, such as an electric wheelchair, having a function of not only travelling by being operated by a person but also detecting an obstacle by an obstacle detection sensor to stop the electric trolley. In the electric trolley, in a case where an abnormality occurs in the electric trolley, the electric trolley is stopped to prevent danger due to rough driving or collision, so that safety is ensured. In the related art, in order to stop an electromotor that performs driving for travel, interruption of a power supply circuit that supplies electric power to the electromotor is performed in a case where an abnormality occurs (PTL 1).

CITATION LIST

Patent Literature

PTL 1: Japanese Patent No. 4134719

SUMMARY OF THE INVENTION

According to the present disclosure, there is provided an electric trolley that travels by controlling a motor fitted to a driving wheel of the electric trolley using a motor driver of the electric trolley, the electric trolley including a safety controller that determines whether or not to stop driving of the driving wheel, and a driving commander that outputs, to the motor driver, (i) an operation permission signal for permitting the motor to be operated and (ii) a control signal for controlling an operation of the motor, in which, when the safety controller determines to stop the driving of the driving wheel, the safety controller performs control to stop inputs of the operation permission signal and the control signal to the motor driver.

BRIEF DESCRIPTION OF DRAWINGS

FIG. 5 is a schematic diagram of stop control according to a fourth exemplary embodiment of the present disclosure.

DESCRIPTION OF EMBODIMENTS

Figure 1:
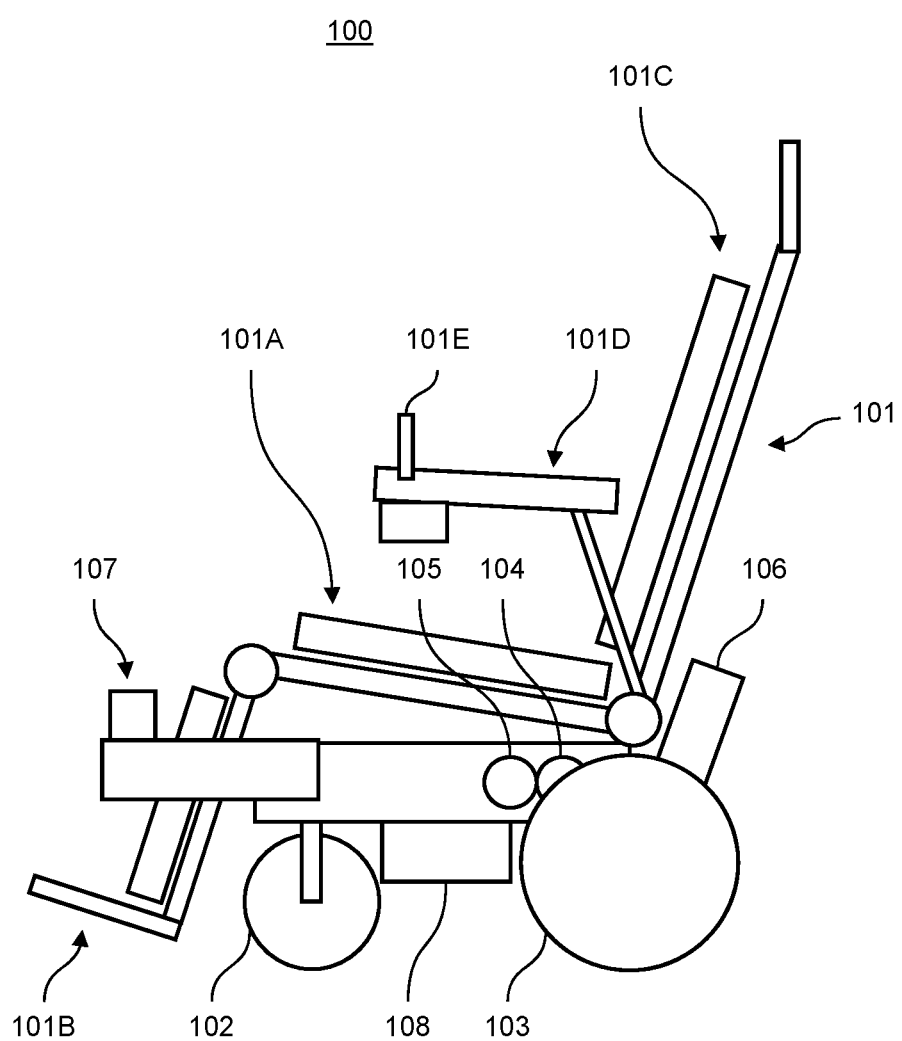
FIG. 1 is a schematic diagram of an electric trolley according to a first exemplary embodiment of the present disclosure.

As described above, in the related art, in a case where an abnormality occurs in an electric trolley, driving of an electromotor is stopped by interrupting a power supply circuit, so that safety is ensured. However, in order to interrupt a large current supplied to the electromotor, an interruption circuit often becomes large and a weight also becomes large.

An object of the present disclosure is to provide an electric trolley capable of mounting a configuration capable of stopping travel more reliably with a small size and a light weight.

Hereinafter, exemplary embodiments of the present disclosure will be described with reference to the accompanying drawings. The same components are designated by the same reference numerals. In addition, the drawings are schematically shown with each component as a subject for easy understanding.

First Exemplary Embodiment

Figure 2:
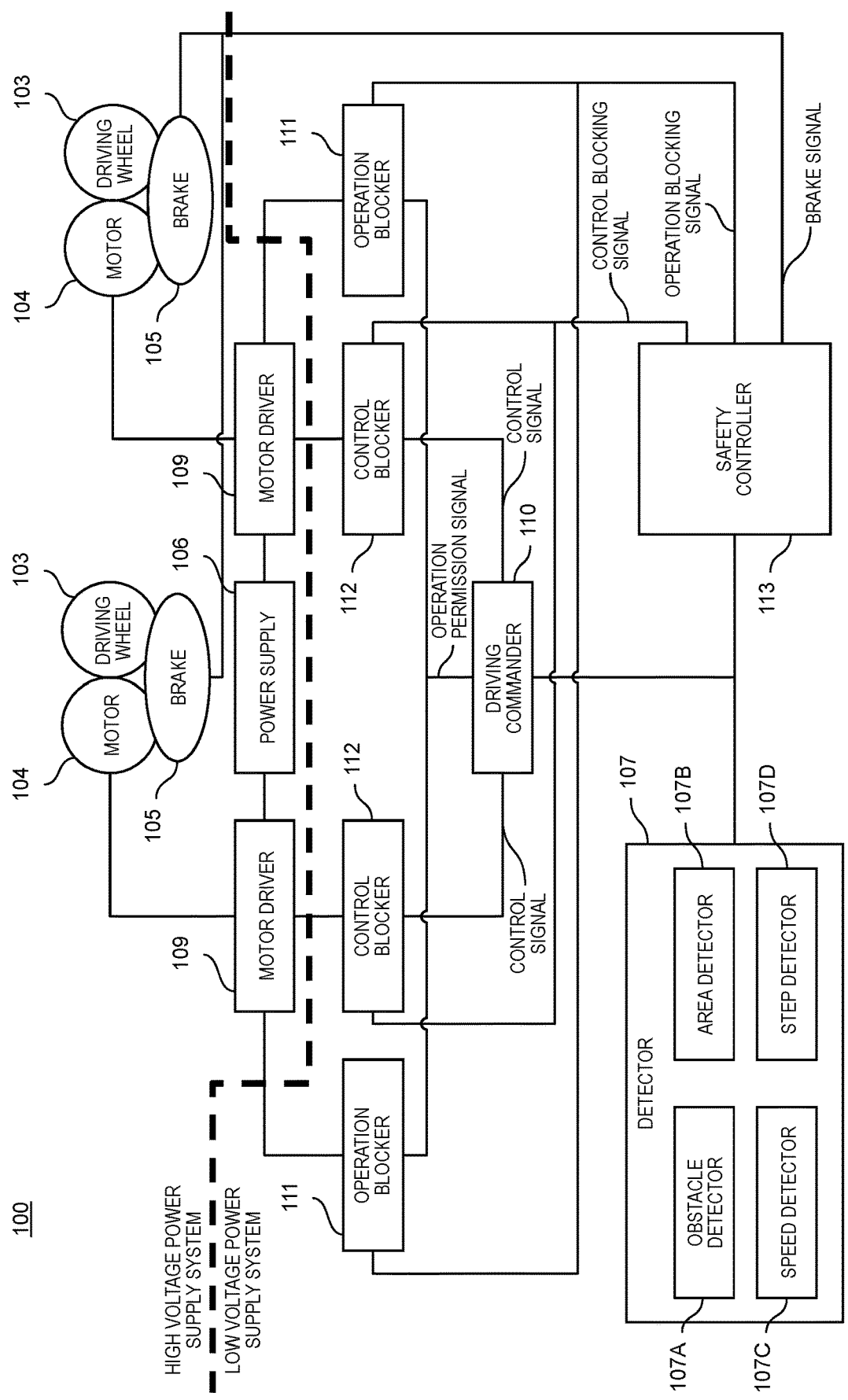
FIG. 2 is a schematic diagram of stop control according to the first exemplary embodiment of the present disclosure.

An electric trolley of the present disclosure will be described with reference to FIGS. 1 and 2. FIG. 1 is a schematic diagram of electric trolley 100, which is viewed from a side surface, according to a first exemplary embodiment of the present disclosure. In addition, FIG. 2 is a schematic diagram of stop control according to the first exemplary embodiment of the present disclosure.

Electric trolley 100 includes main frame 101, training wheel 102, driving wheel 103, motor 104, brake 105, power supply 106, detector 107, and control box 108. Power supply 106 is a high voltage power supply, and supplies electric power to motor driver 109, motor 104, and brake 105, which will be described later. That is, as shown in FIG. 2, power supply 106, motor driver 109, motor 104, and brake 105 belong to a high voltage power supply system.

Main frame 101 is provided with seat 101A, footrest 101B, backrest 101C, and armrest 101D. Armrest 101D is provided with joystick 101E.

A pair of training wheels 102 are installed on left and right sides at a front of electric trolley 100. A pair of driving wheels 103 are installed on left and right sides at a rear of electric trolley 100, and freely rotate around a rotation shaft (not shown) of motor 104. Motor 104 is provided for each of left and right driving wheels 103, and drives each of left and right driving wheels 103 independently. Brake 105 is provided for each of left and right driving wheels 103, and brakes each of left and right driving wheels 103. Power supply 106 supplies electric power to motor 104.

Detector 107 includes at least one of obstacle detector 107A, area detector 107B, speed detector 107C, and step detector 107D which is an example of a road surface detector. Detector 107 is connected to driving commander 110 and safety controller 113, which will be described later.

Obstacle detector 107A is disposed, for example, near a front of electric trolley 100. Obstacle detector 107A detects an obstacle by measuring a distance to a surrounding object, and outputs detected information to safety controller 113, which will be described later. Specifically, obstacle detector 107A is, for example, a laser sensor, which irradiates a periphery of electric trolley 100 with infrared laser light to scan a fan-shaped field centered on the sensor by approximately 270 degrees in a horizontal direction with a fine pitch such as every 0.36 degrees. Further, obstacle detector 107A detects the distance to the surrounding object based on time until reflected light is observed. A Time of Flight (TOF) sensor may be used as obstacle detector 107A. In this case, obstacle detector 107A is realized by a simple configuration rather than the laser sensor. In addition, a stereo camera may be used as obstacle detector 107A. In this case, obstacle detector 107A can acquire color information and the like in addition to depth information. Therefore, it is possible to acquire more detailed information about a surrounding environment and an obstacle and it is possible to realize highly accurate operation control and accurate obstacle avoidance.

Area detector 107B is disposed, for example, near the front of electric trolley 100. Area detector 107B detects area information of indicating whether a current travel area is a travelable area where the electric trolley can travel safely or a dangerous area, and outputs the detected area information to safety controller 113. Specifically, area detector 107B receives a signal from a signal transmitter fixed to a travel environment side, and detects an area of the current travel area.

Speed detector 107C is connected to, for example, motor 104 or is disposed in the vicinity of motor 104. Speed detector 107C detects a travel speed of electric trolley 100 and outputs information of the detected speed to safety controller 113. Specifically, speed detector 107C calculates rotation speeds of motor 104 and driving wheel 103 by reading a rotation angle of motor 104, and detects the travel speed of electric trolley 100.

Step detector 107D is disposed, for example, near the front of electric trolley 100. Step detector 107D detects a step on a travel road surface and outputs information of the detected step to safety controller 113. Specifically, step detector 107D is, for example, a laser sensor, which irradiates the periphery of electric trolley 100 with infrared laser light to scan the fan-shaped field centered on the sensor by approximately 270 degrees in a height direction with the fine pitch such as every 0.36 degrees. Further, step detector 107D detects a distance to the travel road surface based on the time until the reflected light is observed. Further, it is determined that a step exists on the travel road surface based on a predetermined condition such as a case where the distance to the travel road surface is not continuous or a case where the distance is significantly changed. The TOF sensor may be used as step detector 107D. In this case, step detector 107D is realized by a simpler configuration than the laser sensor. In addition, a stereo camera may be used as step detector 107D. In this case, step detector 107D can acquire color information and the like in addition to the depth information. Therefore, it is possible to acquire more detailed information about the step and it is possible to realize highly accurate operation control and accurate step avoidance.

In each of obstacle detector 107A, area detector 107B, speed detector 107C, and step detector 107D, a configuration of a sensor and the like for detecting state information may be grouped with a configuration of a processor and the like for converting the detected state information into information to be output to safety controller 113 or for calculating the state information.

The information detected by detector 107 may be further used for improving travel property of electric trolley 100 such as obstacle avoidance and path generation. At this time, it is desirable that, instead of safety controller 113, driving commander 110, which will be described later, performs control to improve the travel property based on the information detected by detector 107. That is, it is desirable that a configuration in which the detected information by detector 107 is processed and output for improving the travel property is separately configured from a configuration in which the detected information is processed and output for improving safety. As a result, even in a case where a failure or defect occurs in any of the configurations and an abnormality occurs in the control, the operation of electric trolley 100 can be stopped by the other configuration. For example, in a case where an abnormality occurs in the control performed by driving commander 110, safety controller 113 performs control to stop the driving of electric trolley 100 based on the information detected by detector 107, as will be described later. In addition, in a case where an abnormality occurs in the control performed by safety controller 113, driving commander 110 performs control to stop the driving of electric trolley 100 based on the operation amount of joystick 101E.

Control box 108 is provided with motor driver 109, driving commander 110, operation blocker 111, control blocker 112, and safety controller 113. As described above, motor driver 109 belongs to the high voltage power supply system, but driving commander 110, operation blocker 111, control blocker 112, and safety controller 113 belong to a low voltage power supply system. The electric power is supplied from power supply 106 to driving commander 110, safety controller 113, and the like, which belong to the low voltage power supply system via, for example, a step-down transformer.

It is preferable that control box 108, power supply 106, and the like are provided separately from seat 101A, backrest 101C, and the like in order to reduce discomfort to a passenger due to exhausted heat. In addition, it is preferable that control box 108, power supply 106, and the like are provided under electric trolley 100 in order to reduce instability because a center of gravity of electric trolley 100 becomes high.

In a case where the electric power for operation is supplied from power supply 106, motor driver 109 controls the rotation of each motor 104 to operate motor 104.

Motor driver 109 is in a state in which motor 104 can be controlled by inputting an operation permission signal from driving commander 110. Thereafter, motor driver 109 controls rotation of motor 104 so as to operate motor 104 according to a control signal input from driving commander 110. That is, motor driver 109 does not control motor 104 unless the operation permission signal is input from driving commander 110. For example, motor driver 109 does not control motor 104 in a case where the control signal is input from driving commander 110 in a state in which the operation permission signal is not input from driving commander 110.

In a case where driving commander 110 can give a command to motor driver 109, driving commander 110 outputs the operation permission signal to motor driver 109. Thereafter, in a case where the operation amount of joystick 101E is input, driving commander 110 determines a rotation speed of motor 104 based on the operation amount of joystick 101E, and outputs the control signal to motor driver 109. Here, the control signal includes a control value based on the rotation speed of motor 104.

Here, the case where driving commander 110 can give the command to motor driver 109 will be described. For example, in a case where driving commander 110 detects rise of power supply 106 of electric trolley 100, driving commander 110 may transmit the operation permission signal. That is, driving commander 110 transmits the operation permission signal in a case where the travel control becomes possible. At this time, in a case where driving commander 110 detects that electric trolley 100 is stopped for a predetermined period for saving electric power, driving commander 110 may stop transmission of the operation permission signal. In addition, driving commander 110 may transmit the operation permission signal in a case where a failure of detector 107, an abnormality of safety controller 113, or the like is not generated and electric trolley 100 does not have a problem on travel. Here, the abnormality indicates, for example, a state in which power is not supplied to detector 107, a state in which communication between communication configurations cannot be performed, and the like. Driving commander 110 confirms whether or not the states occur by inputting the detected information from detector 107 or performing communication. It is preferable that driving commander 110 transmits the operation permission signal in a case where the states do not occur. In addition, driving commander 110 may transmit the operation permission signal in a case where it is determined that there is no problem on the travel in the surrounding environment of electric trolley 100 based on the detected information by detector 107. In addition, driving commander 110 may transmit the operation permission signal in a case where an instruction is input by a manual operation by a user. For example, the transmission of the operation permission signal may be performed in a case where a brake device included in electric trolley 100 is released by a passenger, or an instruction of the user to operate electric trolley 100 may be input using a terminal or the like capable of communicating with electric trolley 100. In addition, the case where driving commander 110 can give the command to motor driver 109 may be automatically determined by driving commander 110 or may be input manually.

Driving commander 110 may continuously transmit the operation permission signal while determining to be capable of giving the command to motor driver 109, and may stop transmission of the operation permission signal in a case of not being capable of giving the command to motor driver 109.

In this way, operation commander 10 transmits the operation permission signal in addition to the control signal. As a result, even in a case where operation commander 10 erroneously transmits the control signal, the erroneously transmitted control signal can be invalidated by not transmitting the operation permission signal. Therefore, safety can be improved.

Not only the operation amount of joystick 101E but also information related to, for example, a preset speed may be further used for determination of the rotation speed of motor 104 by driving commander 110. In a case where the maximum speed is preset, driving commander 110 determines the rotation speed of motor 104 so that electric trolley 100 operates at a speed which is equal to or less than the set maximum speed. Driving commander 110 may output the operation permission signal or the control signal at the same time to each of motor drivers 109, or may perform individual input. In addition, joystick 101E may have another form such as a handle or a remote controller.

In a case where an operation blocking signal is input from safety controller 113, operation blocker 111 blocks the operation permission signal input from driving commander 110 to motor driver 109. In a case where the operation blocking signal is not input from safety controller 113, operation blocker 111 does not block the operation permission signal output from driving commander 110 to motor driver 109.

Operation blocker 111 is a switching element, and is configured with, for example, a tri-state buffer. A configuration is used in which operation blocker 111 is provided for each motor driver 109 one by one, but the present disclosure is not limited thereto, and the operation permission signal input from driving commander 110 to each motor driver 109 may be blocked by one operation blocker 111. However, in a case where operation blocker 111 is provided for each motor driver 109 one by one, it is possible to cause operation blocker 111 to easily correspond to specification of each motor driver 109 in a case where motor driver 109 is replaced according to driving wheel 103 or motor 104, in a case where the number of motor drivers 109 is increased or decreased, and the like.

In the case where the control blocking signal is input from safety controller 113, control blocker 112 blocks the control signal input from driving commander 110 to motor driver 109. In the case where the control blocking signal is not input from safety controller 113, control blocker 112 does not block the control signal output from driving commander 110 to motor driver 109.

Control blocker 112 is a switching element, and is configured with, for example, a tri-state buffer. A configuration is used in which control blocker 112 is provided for each motor driver 109 one by one, but the present disclosure is not limited thereto, and the operation permission signal input from driving commander 110 to each motor driver 109 may be blocked by one control blocker 112. However, in a case where control blocker 112 is provided for each motor driver 109 one by one, it is possible to cause control blocker 112 to easily correspond to the specification of each motor driver 109 in the case where motor driver 109 is replaced according to driving wheel 103 or motor 104, in the case where the number of motor drivers 109 is increased or decreased, and the like.

Safety controller 113 determines whether or not it is necessary to stop the driving of electric trolley 100 based on the information input from detector 107. In a case where safety controller 113 determines that it is necessary to stop the driving of electric trolley 100, safety controller 113 outputs the operation blocking signal to operation blocker 111 and the control blocking signal to control blocker 112, respectively, through paths independent of each other, and stops driving of motor 104. That is, safety controller 113 includes at least one of a connector for inputting the operation blocking signal to operation blocker 111 and a connector for inputting the control blocking signal to control blocker 112.

Safety controller 113 stops an operation of motor driver 109 by controlling the output of the operation permission signal and an operation of motor 104 independently of each other. In the present exemplary embodiment, safety controller 113 stops the control of motor 104 by motor driver 109 by controlling operation blocker 111 and control blocker 112 independently of each other. As a result, two circuits exist for inputting signals for stopping the driving of motor 104, so that the driving of motor 104 can be stopped more reliably. In addition, safety controller 113 may brake driving wheel 103 by operating brake 105 by inputting a brake signal to brake 105 in a case where the speed is not sufficiently reduced at the same time or after a certain time elapses. The case where the speed is not sufficiently decelerated indicates, for example, a case where the speed is not zero. As a result, three circuits exist for inputting signals for stopping the driving of motor 104, so that the driving of motor 104 can be stopped more reliably.

Here, safety controller 113 determines whether or not it is necessary to stop the driving of electric trolley 100, for example, as follows.

In a case where safety controller 113 detects that a speed of electric trolley 100, which is detected by speed detector 107C, exceeds, for example, a preset speed, safety controller 113 determines that it is necessary to stop the driving of electric trolley 100. At this time, specifically, a situation is conceivable in which motor driver 109 is not normally controlled due to an abnormality or the like in driving commander 110, so that there is a problem in that rough driving or collision occurs.

Alternatively, safety controller 113 determines that it is necessary to stop the driving of electric trolley 100 in a case where obstacle detector 107A detects an obstacle in a very vicinity. At this time, specifically, there is a problem in that a collision with the obstacle in the vicinity may occur. Alternatively, more simply, in a case where obstacle detector 107A detects an obstacle in a predetermined area, safety controller 113 may determine that it is necessary to stop the driving of electric trolley 100. At this time, the driving of electric trolley 100 is stopped at a time in which the obstacle separated from electric trolley 100 by a certain distance is detected, so that the collision can be prevented.

Alternatively, safety controller 113 determines that it is necessary to stop the driving of electric trolley 100 based on the speed of electric trolley 100 detected by speed detector 107C and the distance to the surrounding obstacle detected by obstacle detector 107A. More specifically, safety controller 113 estimates a travel trace in a case where electric trolley 100 is braked based on a current travel speed of electric trolley 100 detected by speed detector 107C, and determines that it is necessary to stop the driving of electric trolley 100 in a case where the obstacle is detected by obstacle detector 107A inside the travel trace. At this time, the obstacle exists in the estimated travel path of electric trolley 100, so that there is a problem in that a collision occurs.

Alternatively, safety controller 113 determines that it is necessary to stop the driving of electric trolley 100 in a case where step detector 107D detects a concave step on the travel road surface. At this time, specifically, it is conceivable that electric trolley 100 is overturned or falls due to the concave step, so that there is a problem in that overturn of the passenger or harm of a surrounding person below the concave step occurs.

Alternatively, safety controller 113 determines that it is necessary to stop the driving of electric trolley 100 based on the area information detected by area detector 107B. Specifically, safety controller 113 determines whether or not it is necessary to stop the driving of electric trolley 100 based on whether or not the current travel area is the dangerous area. For example, safety controller 113 may determine the travelable area while the transmitter is installed in the travelable area and safety controller 113 receives the signal, and safety controller 113 may determine the dangerous area in a case where the signal is blocked. In addition, in a case where the transmitter is installed in the dangerous area and safety controller 113 receives a signal, safety controller 113 may determine the dangerous area. In addition, an ID and attribute information may be added to the signal of the signal transmitter installed on the travel environment, and safety controller 113 may determine whether the travel area is the travelable area or the dangerous area based on the added content.

Although driving commander 110 and safety controller 113 may be configured on the same microcomputer, it is desirable that driving commander 110 and safety controller 113 are separately configured by separating cores in the microcomputer. More desirably, driving commander 110 and safety controller 113 may be physically configured separately by being configured by separate microcomputers or the like. As a result, even in a case where a failure or defect occurs in any of driving commander 110 and safety controller 113 and an abnormality occurs in the control, the operation of electric trolley 100 can be stopped by the other. For example, in a case where an abnormality occurs in the control performed by driving commander 110, safety controller 113 performs control to stop the driving of electric trolley 100 based on the information detected by detector 107. In addition, in a case where an abnormality occurs in the control performed by safety controller 113, for example, a fact of the occurrence of the abnormality is notified to the user by using a display device, a notification device, or the like. As a result, a side of the user can recognize that safety controller 113 cannot be operated, thereby contributing to performing control to stop the driving of electric trolley 100 by driving commander 110 based on the operation amount of joystick 101E by the user. In addition, for example, in a case where an abnormality occurs in the control performed by safety controller 113, safety controller 113 may be designed so that safety controller 113 automatically outputs the operation blocking signal and the control blocking signal. By doing so, the driving of electric trolley 100 can be stopped at a time in which an abnormality occurs in safety controller 113, and travel can be performed with higher safety.

In a case where safety controller 113 is configured, detector 107 is disposed on electric trolley 100 to be connected to safety controller 113 by wire or wirelessly. Alternatively, detector 107, which is already mounted on electric trolley 100, and safety controller 113 are connected by wire or wirelessly. Next, operation blocker 111 is disposed between the connectors for inputting the operation permission signal from driving commander 110 to motor driver 109, and operation blocker 111 and safety controller 113 are connected in wired or wirelessly. In addition, control blocker 112 is disposed between connectors for inputting the control signal from driving commander 110 to motor driver 109, and control blocker 112 and safety controller 113 are connected in wired or wirelessly. However, it is desirable that operation blocker 111, control blocker 112, and safety controller 113 react at a response speed as fast as possible, and a wired connection is preferable.

Driving commander 110 and safety controller 113 may be realized by a computer program. A computer that realizes the above-described driving commander 110 and safety controller 113 using the program may illustratively include a processor, an output device, a memory, a storage, and a power supply circuit. The components are connected to a bus and can communicate with each other.

The processor is an example of a circuit or device having arithmetic capacity. As the processor, for example, at least one of a Central Processing Unit (CPU), a Micro Processing Unit (MPU), and a Graphics Processing Unit (GPU) may be used.

The output device may include, for example, a display (or monitor).

The memory stores, for example, a program executed by the processor and data or information processed according to the execution of the program. The memory may include a Random Access Memory (RAM) and a Read Only Memory (ROM). The RAM may be used as a work memory of the processor. The "program" may be referred to as "software" or "application".

The storage stores the program executed by the processor and data or information processed according to the execution of the program. The storage may include, for example, a semiconductor drive device such as a Hard Disk Drive (HDD) or a Solid State Drive (SSD). In addition to or in place of the semiconductor drive device, a non-volatile memory, such as a flash memory, may be included in the storage.

The program and/or data may be provided in the form of being recorded on a computer (processor) readable recording medium. A flexible disc, a CD-ROM, a CD-R, a CD-RW, an MO, a DVD, a Blu-ray disc, a portable hard disk, and the like may be provided as examples of the recording media. In addition, semiconductor memories, such as a Universal Serial Bus (USB) and a memory, are also examples of recording media.

In addition, the program and/or data may be provided (downloaded), for example, from a server to the computer via a communication line. For example, the program and/or the data may be provided to the computer via a communication device and may be stored in the memory and/or the storage. The program and/or data may also be provided to the computer via an input device and may be stored in the memory and/or the storage.

In the present exemplary embodiment, an example is shown in which operation blocker 111 blocks the operation permission signal output from driving commander 110 to motor driver 109, but the present disclosure is not limited thereto. For example, the operation permission signal may be generated by dividing a voltage from power supply 106. Even in this case, operation blocker 111 is configured to block the operation permission signal. In addition, the operation of motor driver 109 may be stopped by outputting an operation non-permission signal, which is used to prevent the operation permission signal from being output, from safety controller 113 to driving commander 110 without providing operation blocker 111. In addition, the operation of motor driver 109 may be stopped by outputting the control signal, which is used to reduce the amount of electric power to be supplied to motor 104 to 0, from safety controller 113 to driving commander 110 without providing control blocker 112.

Safety controller 113 may release the blocking after confirming that the stop of electric trolley 100 elapses for a certain time based on the travel speed of electric trolley 100 detected by speed detector 107C. Specifically, in a case where safety controller 113 confirms that the stop of electric trolley 100 elapses for the certain time, safety controller 113 stops the output of the control blocking signal and the operation blocking signal. Alternatively, safety controller 113 may confirm that there is no problem on the travel in the surrounding environment of electric trolley 100 based on the detected information by detector 107, and may release the blocking. Specifically, safety controller 113 stops the output of the control blocking signal and the operation blocking signal based on any of a case where the obstacle is not detected by obstacle detector 107A, a case where the current travel area detected by area detector 107B is not the dangerous area, and a case where the step is not detected by step detector 107D. Alternatively, safety controller 113 may release the blocking by a manual operation by the user. Specifically, in a case where an instruction to release the blocking is input using the input device (which may be, for example, a device, such as a switch, that inputs only an intention or may be a device that includes a display unit, such as a touch panel, so as to present other information) by a passenger, a companion, or the like, safety controller 113 stops the output of the control blocking signal and the operation blocking signal.

A configuration included in electric trolley 100 does not need to be limited to the disposition, a shape, and a size shown in FIG. 1, and can be appropriately changed according to a design of electric trolley 100.

As described above, instead of the interruption circuit that interrupts the power supply circuit, electric trolley 100 according to the present disclosure includes operation blocker 111 that blocks the operation permission signal transmitted from operation commander 110, and control blocker 112 that blocks the control signal. Since the power supply circuit belongs to the high voltage power supply system, the interruption circuit is large and heavy. On the other hand, operation blocker 111 and control blocker 112, which are disposed between driving commander 110 and motor driver 109, belong to the low voltage power supply system. Therefore, electric trolley 100 according to the present disclosure can mount a configuration capable of stopping travel more reliably with a small size and a light weight.

Second Exemplary Embodiment

Figure 3:
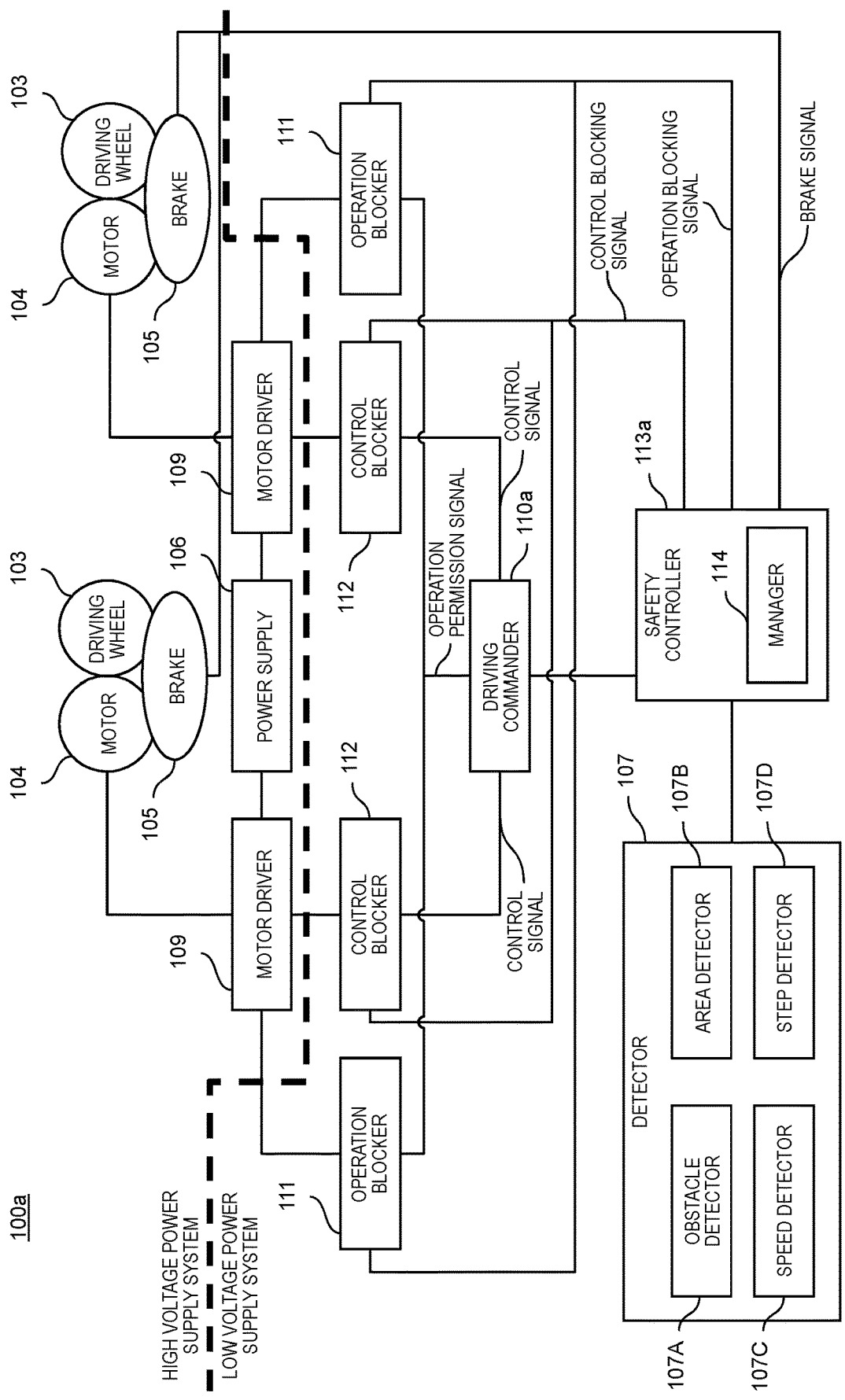
FIG. 3 is a schematic diagram of stop control according to a second exemplary embodiment of the present disclosure.

Electric trolley 100a according to a second exemplary embodiment of the present disclosure will be described with reference to FIG. 3. FIG. 3 is a schematic diagram of stop control according to the second exemplary embodiment of the present disclosure.

Here, in electric trolley 100a according to the second exemplary embodiment, differences from electric trolley 100 according to the first exemplary embodiment will be mainly described. Specifically, in electric trolley 100a according to the second exemplary embodiment, a connection relationship between the detector, the safety controller, and the driving commander is different.

As shown in FIG. 3, detector 107 is connected only to safety controller 113a. Driving commander 110a acquires information output by detector 107 via safety controller 113a.

Specifically, safety controller 113a includes manager 114. Manager 114 manages detector 107, acquires the information output by detector 107, and outputs the acquired information to driving commander 110a.

That is, safety controller 113a acquires the information output from detector 107 prior to driving commander 110a, and confirms content thereof. Therefore, safety controller 113a can confirm information to be input to driving commander 110a. Further, safety controller 113a can guarantee that driving commander 110a and safety controller 113a are operated according to information of the same detector 107. Since detector 107 has a single output destination, detector 107 can be applied even to a detector in which it is difficult to branch an output signal.

Safety controller 113a may output the information from detector 107 to driving commander 110a only in a case where it is determined to be a safety state based on the information from detector 107. In this case, safety controller 113a can operate driving commander 110a based on the information of detector 107 which determines the safe state.

In electric trolley 100 according to the first exemplary embodiment, feedback to detector 107 is provided from two systems including driving commander 110 and safety controller 113. On the other hand, in the present exemplary embodiment, manager 114 can centrally manage the feedback to detector 107.

Third Exemplary Embodiment

Figure 4:
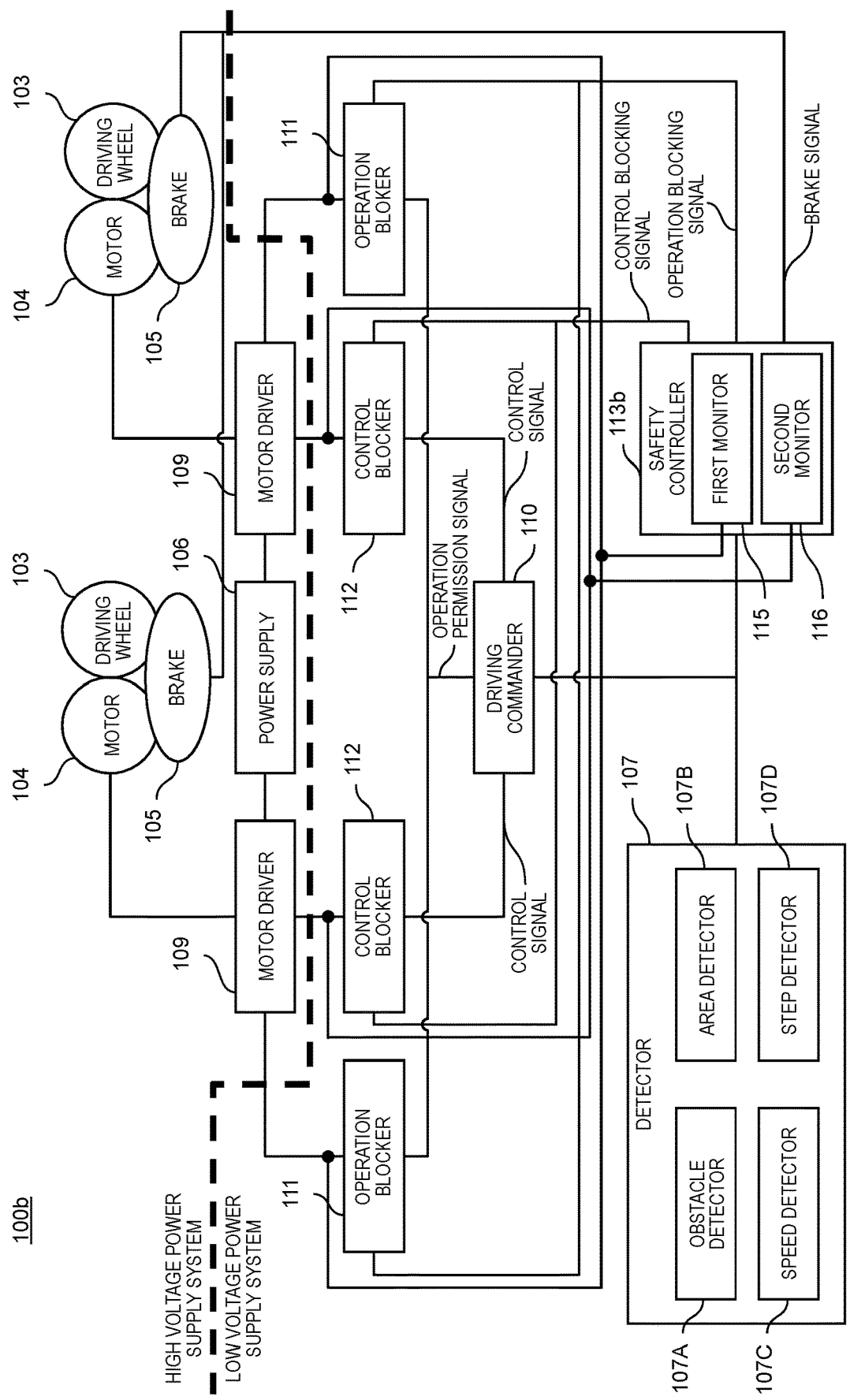
FIG. 4 is a schematic diagram of stop control according to a third exemplary embodiment of the present disclosure.

Electric trolley 100b according to a third exemplary embodiment of the present disclosure will be described with reference to FIG. 4. FIG. 4 is a schematic diagram of stop control according to the third exemplary embodiment of the present disclosure.

Here, in electric trolley 100b according to the third exemplary embodiment, differences from electric trolley 100 according to the first exemplary embodiment will be mainly described. Specifically, electric trolley 100b according to the third exemplary embodiment has a function of monitoring operations of operation blocker 111 and control blocker 112.

As shown in FIG. 4, safety controller 113b according to the present exemplary embodiment includes first monitor 115 and second monitor 116. First monitor 115 monitors a signal output from operation blocker 111 to motor driver 109. Second monitor 116 monitors a signal output from control blocker 112 to motor driver 109.

As a result, in a case where the operation blocking signal and the control blocking signal are output, safety controller 113b can confirm whether or not operation blocker 111 and control blocker 112 normally function.

Safety controller 113b may include a single monitor that integrates the functions of the two monitors. In addition, safety controller 113a according to the second exemplary embodiment may include first monitor 115 and second monitor 116.

Fourth Exemplary Embodiment

Electric trolley 100c according to a fourth exemplary embodiment of the present disclosure will be described with reference to FIG. 5. FIG. 5 is a schematic diagram of stop control according to the fourth exemplary embodiment of the present disclosure.

Here, in electric trolley 100c according to the fourth exemplary embodiment, differences from electric trolley 100 according to the first exemplary embodiment will be mainly described. Specifically, in electric trolley 100c according to the fourth exemplary embodiment, a configuration in which the operation blocking signal is output is independent of a configuration in which the control blocking signal is output.

As shown in FIG. 5, safety controller 113c according to the present exemplary embodiment includes first determiner 117 and second determiner 118. In a case where first determiner 117 determines that it is necessary to stop driving of electric trolley 100c based on information from detector 107, first determiner 117 outputs the operation blocking signal to operation blocker 111. In a case where second monitor 116 determines that it is necessary to stop the driving of electric trolley 100c based on the information from detector 107, second monitor 116 outputs the control blocking signal to control blocker 112.

It is desirable that first determiner 117 and second determiner 118 are separately configured by separating cores in the same microcomputer. More desirably, first determiner 117 and second determiner 118 may be physically configured separately by being configured by separate microcomputers or the like.

First determiner 117 and second determiner 118 perform mutual monitoring and monitor that other determiners normally operate. As a result, even in a case where first determiner 117 or second determiner 118 fails, the blocking signal by the other determiner is reliably output.

INDUSTRIAL APPLICABILITY

The electric trolley of the present disclosure is useful in an area where indoor and outdoor movement is required.

REFERENCE MARKS IN THE DRAWINGS

100 Electric trolley
101 Main frame
101A Seat
101B Footrest
101C Backrest
101D Armrest
101E Joystick
102 Training wheel
103 Driving wheel
104 Motor
105 Brake
106 Power supply
107 Detector
107A Obstacle detector
107B Area detector
107C Speed detector
107D Step detector (road surface detector)
108 Control box
109 Motor driver
110 Driving commander
111 Operation blocker
112 Control blocker
113 Safety controller

The invention claimed is:

1. An electric trolley that travels by controlling a motor fitted to a driving wheel of the electric trolley using a motor driver of the electric trolley, the electric trolley comprising:
   a safety controller that determines whether or not to stop driving of the driving wheel;
   a driving commander that outputs, to the motor driver, (i) an operation permission signal for permitting the motor to be operated and (ii) a control signal for controlling an operation of the motor.
   an operation blocker that is provided between the driving commander and the motor driver, and blocks the operation permission signal based on an operation blocking signal input from the safety controller; and
   a control blocker that is provided between the driving commander and the motor driver, and blocks the control signal based on a control blocking signal input from the safety controller, wherein
   when the safety controller determines to stop the driving of the driving wheel, the safety controller outputs the operation blocking signal to the operation blocker to stop input of the operation permission signal to the motor driver and outputs the control blocking signal to the control blocker to stop input of the control signal to the motor driver.

2. The electric trolley of claim 1, wherein
the safety controller outputs the operation blocking signal and the control blocking signal through mutually different paths.

3. The electric trolley of claim 1, wherein
the safety controller operates a brake by inputting a brake signal to the brake for braking the driving wheel at the same time as outputting the operation blocking signal and the control blocking signal or when a speed is not reduced even though a certain time elapses after outputting the operation blocking signal and the control blocking signal.

4. The electric trolley of claim 1, further comprising:
an obstacle detector that detects an obstacle around the electric trolley, wherein
the safety controller determines whether or not to stop the driving of the driving wheel based on information related to the obstacle detected by the obstacle detector.

5. The electric trolley of claim 1, further comprising:
a speed detector that detects a speed of the electric trolley, wherein the safety controller determines whether or not to stop the driving of the driving wheel based on information related to the speed of the electric trolley detected by the speed detector.

6. The electric trolley of claim 1, further comprising:
a road surface detector that detects a state of a road surface on which the electric trolley travels, wherein
the safety controller determines whether or not to stop the driving of the driving wheel based on information related to the road surface detected by the road surface detector.

7. The electric trolley of claim 1, further comprising:
an area detector that detects area information indicating whether an area in which the electric trolley travels is a travelable area where the electric trolley can travel safely or a dangerous area, wherein
the safety controller determines whether or not to stop the driving of the driving wheel based on the area information detected by the area detector.

* * * * *